United States Patent
Chavali

(10) Patent No.: US 9,942,109 B2
(45) Date of Patent: Apr. 10, 2018

(54) HEALTH METRIC FOR AN INFORMATION TECHNOLOGY SERVICE

(71) Applicant: CA, Inc., New York, NY (US)

(72) Inventor: Praveen Chavali, Hyderabad (IN)

(73) Assignee: CA, Inc., New York, NY (US)

( * ) Notice: Subject to any disclaimer, the term of this patent is extended or adjusted under 35 U.S.C. 154(b) by 266 days.

(21) Appl. No.: 14/840,263

(22) Filed: Aug. 31, 2015

(65) Prior Publication Data

US 2017/0063650 A1    Mar. 2, 2017

(51) Int. Cl.
G06F 15/173    (2006.01)
H04L 12/24     (2006.01)

(52) U.S. Cl.
CPC ...... H04L 41/5074 (2013.01); H04L 41/5067 (2013.01)

(58) Field of Classification Search
CPC .......................... H04L 41/5074; H04L 41/5067
See application file for complete search history.

(56) References Cited

U.S. PATENT DOCUMENTS

| | | | |
|---|---|---|---|
| 2013/0191520 A1* | 7/2013 | Khouri | H04L 41/5067 709/223 |
| 2014/0086073 A1* | 3/2014 | Baykal | H04L 41/5067 370/252 |
| 2015/0142506 A1* | 5/2015 | Kumar | G06Q 10/0635 705/7.28 |
| 2016/0226733 A1* | 8/2016 | Niemoeller | H04L 41/5067 |

\* cited by examiner

*Primary Examiner* — Nam Tran
(74) *Attorney, Agent, or Firm* — Coats & Bennett, PLLC

(57) ABSTRACT

A service desk management server obtains information about an incident associated with a customer-facing information technology (IT) service, a change order associated with the customer-facing IT service, or both. The service desk management server calculates, as a function of the obtained information, a health metric that quantitatively indicates a customer-perceived health of the customer-facing IT service. The service desk management server assists a service catalog server to compose a service catalog to indicate the health metric for the customer-facing IT service to prospective customers of that service. The service desk management server's assistance in this regard comprises sending the health metric from the service desk management server to the service catalog server.

18 Claims, 12 Drawing Sheets

HEALTH METRIC FOR AN INFORMATION TECHNOLOGY SERVICE

BACKGROUND

The present disclosure generally relates to a service desk management server, and more particularly to a service desk management server for a customer-facing information technology (IT) service.

Customer-facing IT services (also referred to as 'business services') are IT services that a provider supplies to one or more customers for directly supporting those customers' business processes. Customer-facing IT services include, for example, password resets, new hardware and/or software requests, email, and the like. This contrasts with supporting IT services that the IT service provider internally uses for delivering customer-facing IT services, including for instance data backup, application hosting, security, etc. Unlike supporting IT services, customer-facing IT services are visible to customers.

A customer in this regard browses a so-called service catalog that contains information about the different customer-facing IT services available to the customer. The service catalog may, for example, describe what the service provides, indicate to whom the service is available, and identify a target level of service that should be expected, e.g., according to a service level agreement (SLA). A customer may even electronically request or "order" a desired service via the service catalog.

A service desk serves as a single point of contact between the IT service provider and its customers. Customers therefore contact the service desk if and when they experience an incident with a service.

BRIEF SUMMARY

The present disclosure provides a method, an apparatus, and a corresponding computer program product for indicating a customer-perceived health of a customer-facing IT service in a service catalog.

According to some embodiments, for example, a method comprises a service desk management server obtaining information about an incident associated with a customer-facing IT service, a change order associated with the customer-facing IT service, or both. The method further comprises the service desk management server calculating, as a function of the obtained information, a health metric that quantitatively indicates a customer-perceived health of the customer-facing IT service. The method also comprises the service desk management server assisting a service catalog server to compose a service catalog to indicate the health metric for the customer-facing IT service to prospective customers of that service. This assisting comprises sending the health metric from the service desk management server to the service catalog server.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
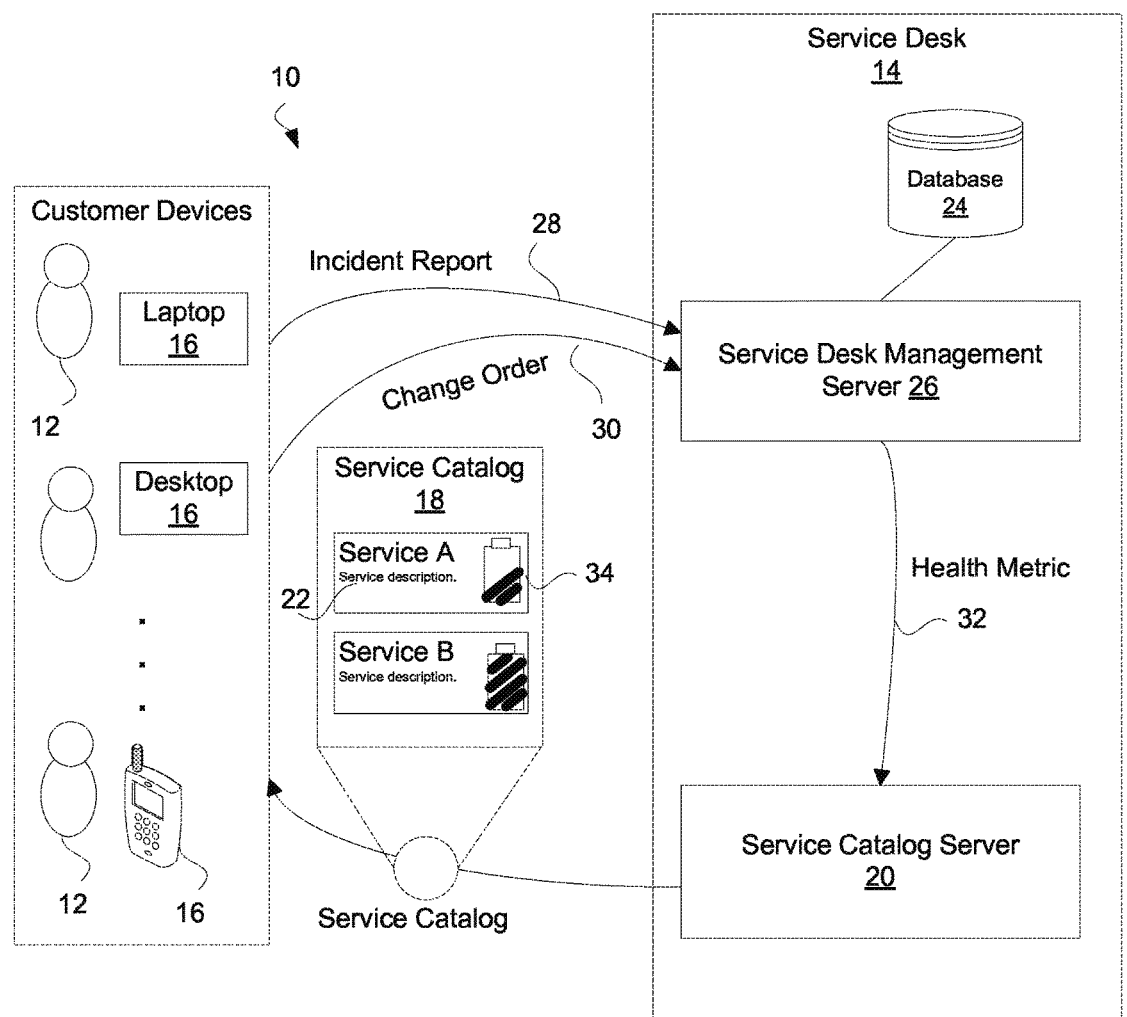
FIG. 1 is a block diagram of a system according to one or more embodiments herein, including a service desk management server and a service catalog server.

FIG. 1 illustrates an IT service provider system 10 for supplying customer-facing IT services to customers 12. These services directly support the customers' respective business processes. As shown, the system 10 includes a service desk 14 that serves as a single point of contact between the IT service provider and its customers 12. A customer 12 in this regard uses a customer device 16 (e.g., a laptop or mobile terminal) to electronically browse a service catalog 17 provided by a service catalog server 20 associated with the service desk 14. This service catalog 18 contains information about the different customer-facing IT services available to the customer 12. For example, the catalog 18 in some embodiments includes a description 22 of what each service provides to the customer 12, and allows the customer 12 to electronically request or "order" the service.

Any event which is not part of the standard operation of a customer-facing IT service (e.g., as defined by a service level agreement (SLA)), and which causes, or may cause, an unplanned interruption to, or a reduction in the quality of, that service constitutes a so-called incident. If a customer 12 notices an incident, the customer 12 is permitted to report the incident to the service desk 14. Reporting the incident in some embodiments involves the customer 12 notifying service desk personnel of the incident via telephone, email, or otherwise, whereupon the service desk personnel enter information about the incident into a database 24 associated with a service desk management server 26 (e.g., a configuration management database, CMDB). Alternatively, reporting the incident in other embodiments involves the customer 12 using his or her device 16 to electronically send an incident report 28 to the service desk management server 26, without direct interaction with service desk personnel.

When an incident is reported, the service desk management server 26 institutes an incident management process with the goal of resolving the incident, e.g., restoring normal service operation. Resolving the incident in at least some embodiments requires that some sort of change must be made in the system 10. A change in this regard is the addition, modification, or removal of anything that has an effect on the service at issue, including for instance the addition, modification, or removal of hardware, network, software, environment, people, documentation, or the like. In some embodiments, a customer 12 orders (i.e., requests) a change himself or herself. FIG. 1 for instance depicts a customer 12 electronically submitting a change order 30 from his or her device 16 to the service desk management server 26. In other embodiments, service desk personnel or the service desk management server 26 submit a change order.

Figure 2:
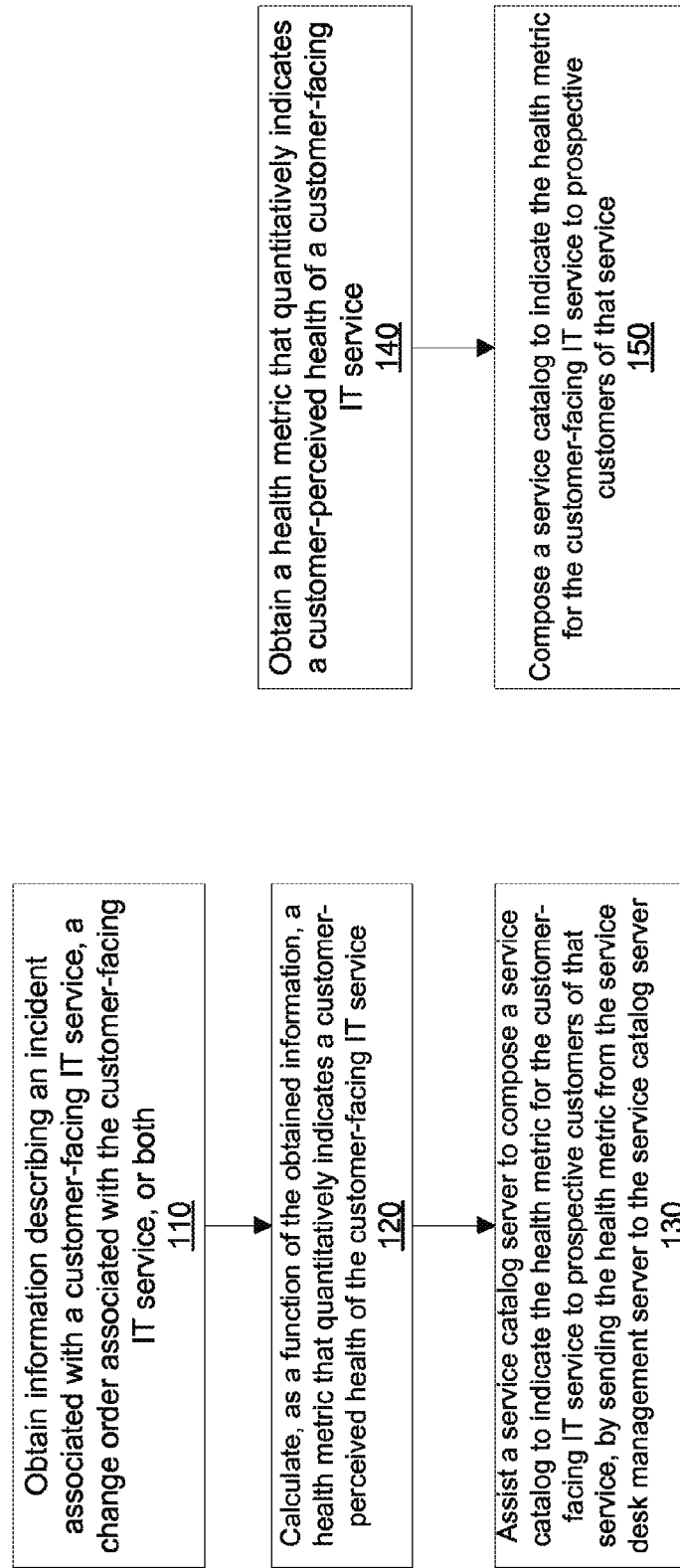
FIG. 2A is a logic flow diagram of a method performed by a service desk management server according to one or more embodiments.
FIG. 2B is a logic flow diagram of a method performed by a service catalog server according to one or more embodiments.

One or more embodiments herein exploit information obtained by the service desk management server 26 about an incident associated with a customer-facing IT service, a change order associated with that service, or both, as information that reflects the extent to which customers perceive the service to be healthy or unhealthy. For example, a customer 12 that reports an incident with a service perceives the service as being unhealthy to some extent, irrespective of whether the service is in fact healthy. A service perceived as unhealthy for instance has a number of incidents or change orders against it, whereas a service perceived as healthy operates with a reasonable degree of maturity and fewer disruptions. FIG. 2A illustrates processing performed by the service desk management server 26 in this regard according to one or more embodiments.

As shown in FIG. 2A, processing 100 by the service desk management server 26 comprises obtaining information about an incident associated with a customer-facing IT service, a change order associated with the customer-facing IT service, or both (Block 110). In one or more embodiments, the information is about a customer-reported incident, a change order resulting from a customer-reported incident, or both. In some embodiments, the service desk management server 26 obtains this information in substantially real-time, as that information becomes available in the system 10.

Regardless, processing 100 further comprises calculating, as a function of the obtained information, a health metric 32 that quantitatively indicates a customer-perceived health of the customer-facing IT service (Block 120). Processing 100 also comprises the service desk management server 26 assisting the service catalog server 20 to compose the service catalog 18 to indicate the health metric 32 for the customer-facing IT service to prospective customers of that service, by sending the health metric 32 from the service desk management server 26 to the service catalog server 20 (block 130). FIG. 1, for example, shows that the service catalog 18 indicates the health metric with a fill level of a battery icon 34 (e.g., with a lower level of filling indicating a lower level of customer-perceived health).

FIG. 2B illustrates corresponding processing at the service catalog server 20. As shown, such processing comprises obtaining a health metric 32 that quantitatively indicates a customer-perceived health of the customer-facing IT service (Block 140). Processing further includes composing the service catalog 18 to indicate the health metric 32 for the customer-facing IT service to prospective customers of that service (Block 150).

By performing the above processing 100, the service desk management server 26 in at least some embodiments advantageously assists customers 12 in selecting which service in the catalog 18 to request. For example, an indication in the service catalog 18 that a particular service is perceived by customers 12 to be relatively unhealthy serves as a deterrent to requesting that service. Customers 12 in this case may instead opt to request an alternative service that the catalog 18 indicates customers 12 perceive to be relatively healthy. The health metric thus adds a quantitative dimension to the service catalog so that customers 12 may make an informed decision about their service selections and/or service managers may focus on improving or retiring a service.

In one or more embodiments, the service desk management server 26 recursively calculates the health metric 32 for a service also as a function of a previously calculated health metric for that service. In this way, the health metric 32 for a service depends at least to some extent on whether the service is historically healthy. The service desk management server 26 for example calculates the health metric 32 to indicate that customers 12 perceive a service which demonstrates time-tested health stability to have better health than another service whose health is unstable, even if those services have the same customer-perceived health at a given snapshot in time. By incorporating service health history into its calculation of the health metric, the service desk management server 26 for example guards customers 12 from unwittingly requesting a seemingly healthy service at one time, only to perceive the service as being unhealthy at a later time.

Figure 3:
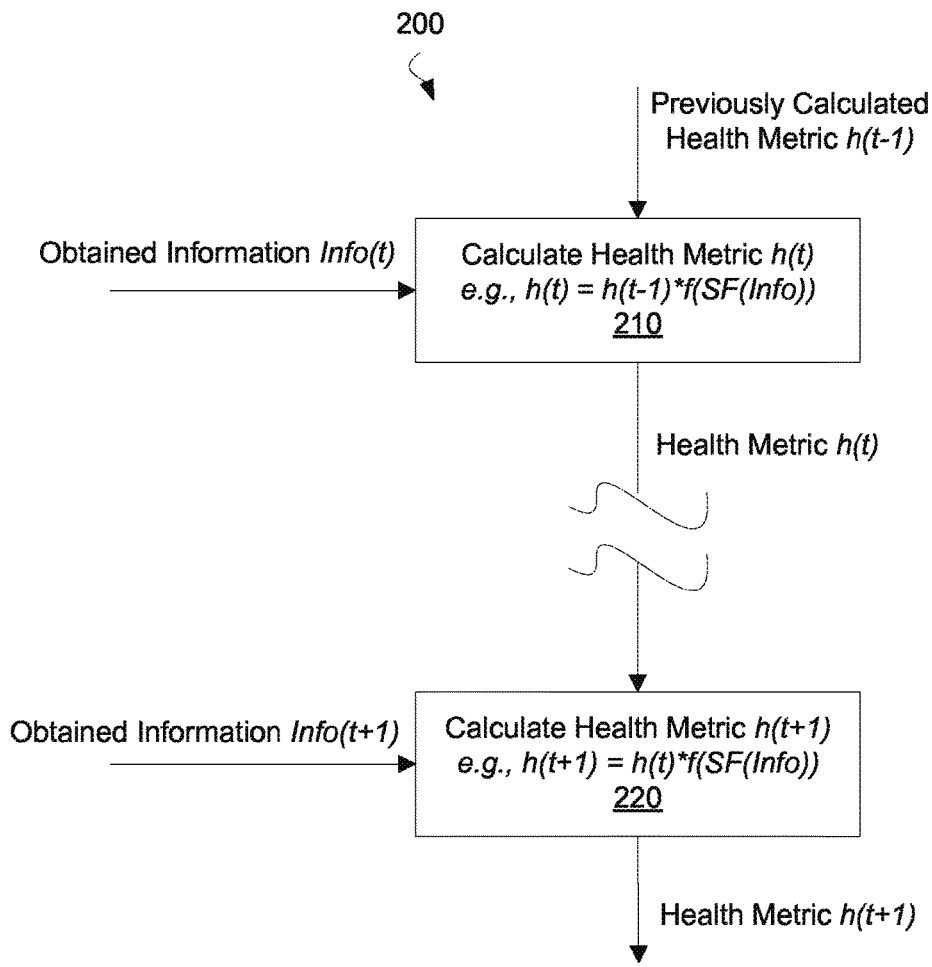
FIG. 3 is a logic flow diagram of a method for recursively calculating a health metric according to one or more embodiments.

FIG. 3 illustrates processing 200 for recursive health metric calculation according to one example. As shown, the service desk management server 26 obtains information Info(t) at time t about an incident associated with a customer-facing IT service, a change order associated with the customer-facing IT service, or both. The service desk management server 26 also obtains a health metric h(t−1) previously calculated at time t−1 for the service. The service desk management server 26 then calculates a health metric h(t) that quantitatively indicates a customer-perceived health of the service at time t, as a function of the obtained information Info(t) as well as the previously calculated health metric h(t−1) (Block 210). In at least one embodiment, for example, the service desk management server 26 calculates the health metric h(t) by determining a scaling factor based on the obtained information, and scaling the previously calculated health metric as a function of the scaling factor. In this case, the service desk management server 26 determines a scaling factor SF (Info) based on the obtained information Info (t), and scales the previously calculated health metric h(t−1) by a function of that scaling factor SF (Info) to obtain the health metric h(t) for time t, i.e., h(t)=h(t−1)*f(SF(Info)), where f(x) denotes a function f( ) of x. The scaling factor SF (Info) in some embodiments is any configurable floating point value less than 1. Regardless, this recursive calculation continues on similarly for subsequent iterations at time t+1 (Block 220), etc.

Irrespective of whether the health metric is recursively calculated, information about an incident associated with a customer-facing IT service in some embodiments indicates a priority of the incident, i.e., how the service desk 14 prioritizes the incident in terms of how quickly it should address the incident. In one embodiment, for example, the information is one of multiple different values predefined as indicating different priority levels (e.g., 1 for critical priority, 2 for high priority, 3 for moderate priority, 4 for low priority, etc.). Different priority levels may be associated with different target response times by the service desk 14 and/or different target resolution (i.e., closure) times, e.g., as specified by a SLA. For example, critical priority may target immediate response by service desk 14 and incident resolution within 1 hour, high priority may target response within 10 minutes and resolution within 4 hours, medium priority may target response within 1 hour and resolution within 8 hours, and low priority may target response within 4 hours and resolution within 24 hours.

Alternatively or additionally, the information about an incident indicates an urgency and/or impact of the incident. The impact of an incident is a measure of the effect of an incident on one or more customers' 12 business processes, e.g., based on how service levels will be affected. An incident may have high impact, for example, if a large number of customers are affected and/or acutely disadvantaged in some way, the financial impact of the incident is high. The urgency of an incident reflects the extent to which the incident's resolution can bear delay, e.g., how long it will be until the incident has a significant impact. An incident may have high urgency, for example, if the damage caused by the incident increases rapidly, work that cannot be completed by staff is highly time sensitive, a minor incident can be prevented from becoming a major incident by acting immediately, and/or multiple users with VIP status are affected. By contrast, an incident may have medium urgency if the damage caused by the incident increases considerably over time (rather than just marginally) and/or a single user with VIP status is affected.

In at least some embodiments, an incident's priority depends on its urgency and impact. For example, the urgency and impact may map to or otherwise dictate the incident's priority, e.g., high impact and high urgency map to critical priority, high impact but medium urgency map to high priority, high impact but low urgency map to moderate priority, medium impact but high urgency map to high priority, etc.

In still other embodiments, the information about an incident indicates whether the incident is defined as a major incident, e.g., according to one or more defined criteria. A major incident in some embodiments is the highest category of impact for an incident. A major incident may therefore result in significant disruption to one or more customers' business processes. In one embodiment, a major incident even calls for action by a special service desk team dedicated for responding to major incidents.

Alternatively or additionally, the information about an incident indicates an escalation status of the incident. The escalation status of the incident reveals the extent to which service desk resources are allocated for addressing the incident. Escalation in this regard may refer to functional escalation (the transfer of the incident to a technical team with a higher level of expertise), hierarchic escalation (the involvement of more senior levels of management), or both. In any event, the escalation status of an incident in some embodiments depends on the amount of time that has passed since the incident has been updated in the system 10 (e.g., by service desk personnel updating the database 24 regarding progress made towards resolving the incident). Escalation based on such passage of time (i.e., apparent inactivity) prevents incidents from slipping through the cracks of the service desk 14. Alternatively or additionally, the escalation status of an incident depends on how much time is left until a certain time-based service level target (e.g., response time or resolution time) is to be met according to the SLA, or how much time has passed since that service level target was supposed to have been met.

In still other embodiments, the information about an incident indicates a closure status of the incident. The closure status indicates whether the service desk 14 deems the incident closed. This is the final status in the lifecycle of an incident. When the status is closed, no further action is taken on the incident. For example, the incident may be closed when the incident is resolved and normal service operation is restored.

In yet other embodiments, the information about an incident indicates any combination of the above, e.g., as obtained by the server 32 at a given time or at different times. That is, the information indicates an urgency of the incident, an impact of the incident, a priority of the incident, whether the incident is defined as a major incident, an escalation status of the incident, a closure status of the incident, or any combination thereof.

Figure 4A:
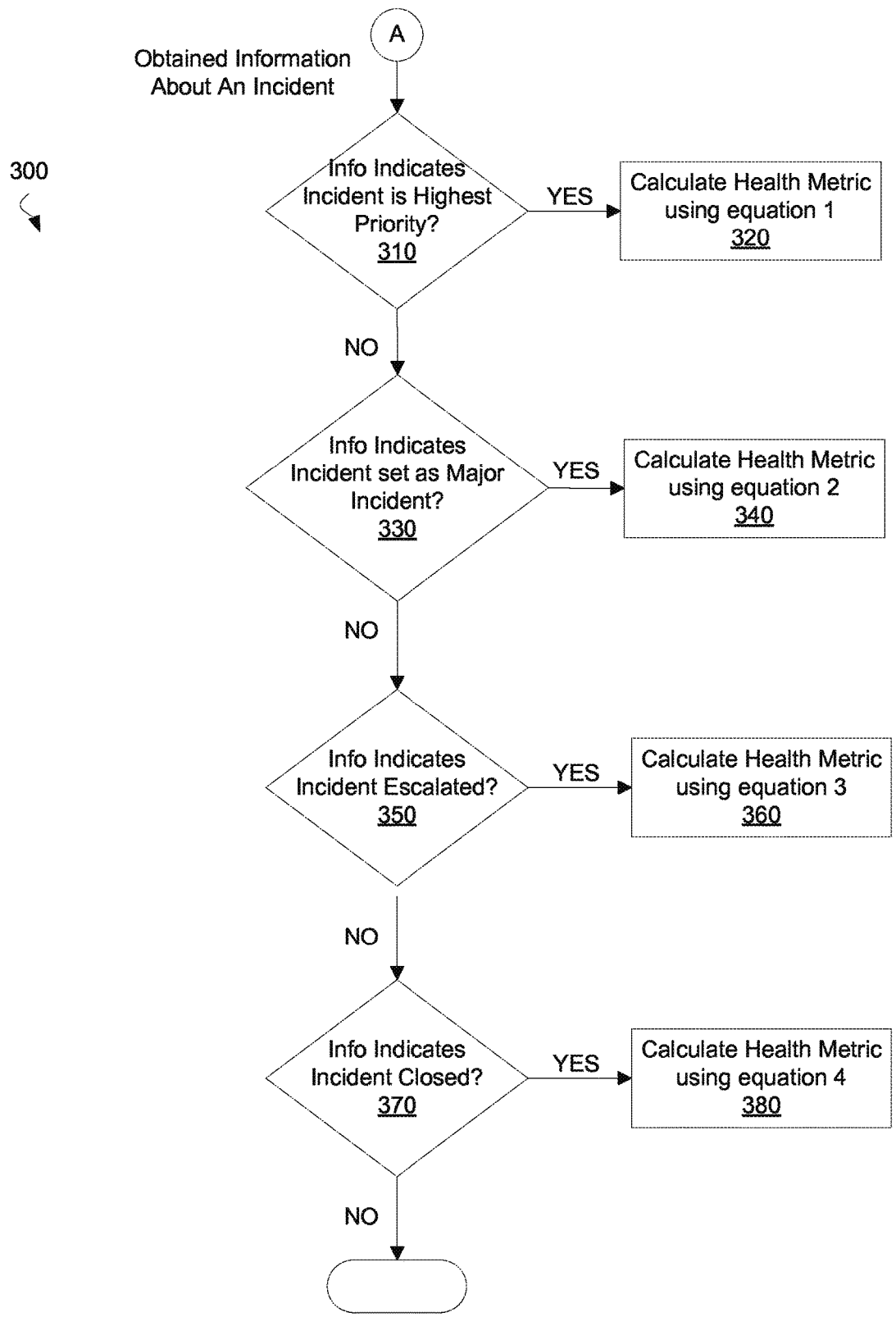
FIG. 4A is a logic flow diagram of a method for calculating a health metric based on information about an incident associated with a service, according to one or more embodiments.

FIG. 4A in this regard illustrates processing 300 for calculating the health metric 32 for a customer-facing IT service according to one exemplary embodiment. In this embodiment, the service desk management server 26 calculates the health metric 32 using different equations (arbitrarily labeled for instance as equations 1, 2, 3, etc.) for different types of information obtained about an incident associated with the service.

As shown, the service desk management server 26 determines whether the information indicates that the incident's priority is the highest possible priority (e.g., a Priority 1, P1, incident) (Block 310). If so (YES at Block 310), the service desk management server 26 calculates the health metric 32 using a first equation (i.e., equation 1) (Block 320). In embodiments where the service desk management server 26 calculates the health metric h(t) recursively using a previously calculated metric h(t−1), this first equation in one example is $h(t)=h(t-1)*f(SF_1)$, where $SF_1$ is a scaling factor defined for scaling the health metric 32 when an incident associated with a service has the highest priority, and where $SF_1<1$.

Regardless, if the information does not indicate that the incident's priority is the highest possible priority (NO at Block 310), the service desk management server 26 determines whether the information indicates that the incident is defined as a major incident (Block 330). If so (YES at Block 330), the service desk management server 26 calculates the health metric 32 using a second equation (i.e., equation 2) (Block 340). In embodiments where the service desk management server 26 calculates the health metric h(t) recursively using a previously calculated metric h(t−1), this second equation in one example is $h(t)=h(t-1)*f(SF_2)$, where $SF_2$ is a scaling factor defined for scaling the health metric 32 when an incident associated with a service is defined as a major incident, and where $SF_2<1$.

However, if the information does not indicate that the incident is defined as a major incident (NO at Block 330), the service desk management server 26 determines whether the information indicates that the incident has been escalated, e.g., to at least a defined level (Block 350). If so (YES at Block 350), the service desk management server 26 calculates the health metric 32 using a third equation (i.e., equation 3) (Block 360). In embodiments where the service desk management server 26 calculates the health metric h(t) recursively using a previously calculated metric h(t−1), this third equation in one example is h(t)=h(t−1)*f(SF$_3$), where SF$_3$ is a scaling factor defined for scaling the health metric 32 when an incident associated with a service has been escalated, e.g., to at least a defined level, and where SF$_3$<1.

Finally, if the information does not indicate that the incident has been escalated (NO at Block 350), the service desk management server 26 determines whether the information indicates that the incident has been closed (Block 370). If so (YES at Block 370), the service desk management server 26 calculates the health metric 32 using a fourth equation (i.e., equation 4) (Block 360).

This fourth equation in some embodiments calculates the health metric 32 based simply on whether the incident has been closed. In other embodiments, though, the fourth equation calculates the health metric 32 based on the actual time at which the incident was closed. For example, in embodiments where the service desk management server 26 calculates the health metric h(t) recursively using a previously calculated metric h(t−1), this fourth equation may be h(t)=h(t−1)*f(ct)*f(SF$_4$), where SF$_4$ is a scaling factor defined for scaling the health metric 32 when an incident associated with a service has been closed, where SF$_4$<1 and where ct is the incident's closure time.

The fourth equation in still other embodiments calculates the health metric 32 based not only on the actual time at which the incident was closed, but also based on the time at which the incident was supposed to have been closed according to the applicable SLA, e.g., based on the extent to which the SLA governing the service is violated due to delay in closing the incident. In one embodiment, for example, the service desk management server 26 computes f(ct) above based on the incident's closure time and the time at which the incident should have been closed according to the applicable SLA, e.g., f(ct)=ct/vt or f(ct)=ct−vt where vt is the time the incident should have been closed (else a violation of the SLA occurs) and vt<ct (i.e., an SLA violation occurred).

Although FIG. 4A shows processing 300 performed in a certain order, the processing 300 in other embodiments is performed in a different order.

Figure 4B:
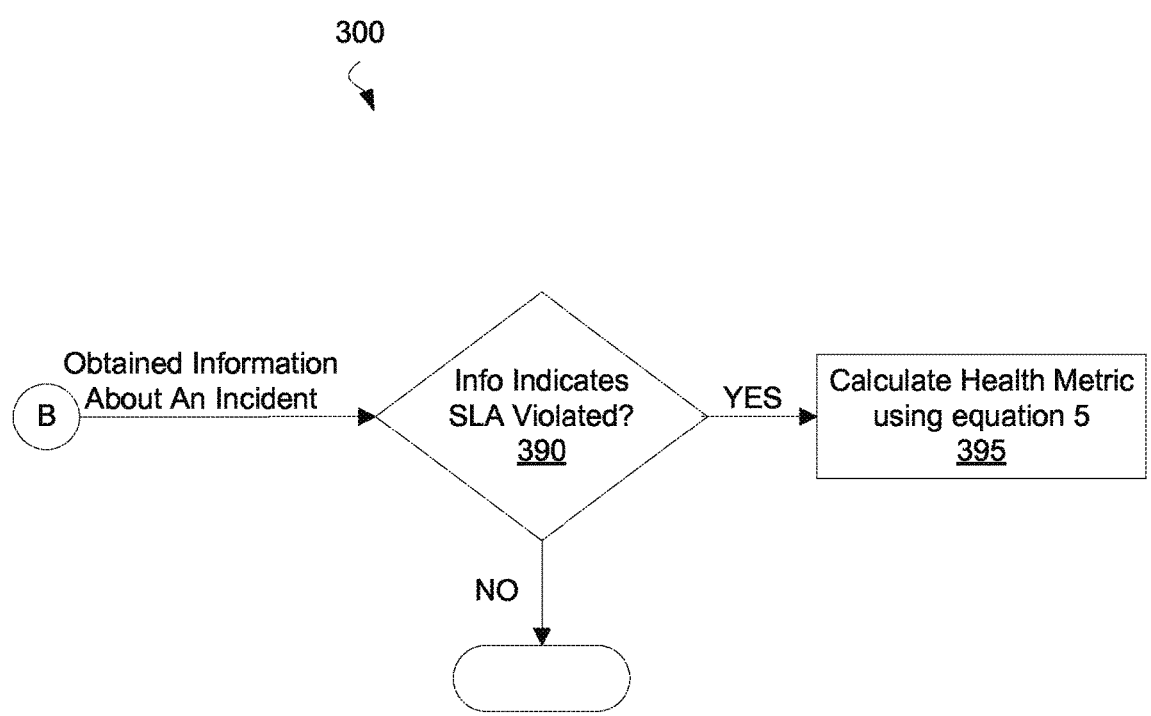
FIG. 4B is a logic flow diagram of a method for calculating a health metric based on information about an incident associated with a service, according to one or more other embodiments.

Alternatively or additionally, the service desk management server 26 in some embodiments obtains information that simply indicates whether a SLA governing the customer-facing IT service is violated, e.g., due to delay in closing the incident. The service desk management server 26 in this case may calculate the health metric 32 using still a different equation for this different type of information. As shown in FIG. 4B, for instance, if the obtained information indicates that the SLA governing the incident is violated (e.g., due to delay in closing the incident) (YES at Block 390), the service desk management server 26 calculates the health metric 32 using a fifth equation (i.e., equation 5) (Block 395). In embodiments where the service desk management server 26 calculates the health metric h(t) recursively using a previously calculated metric h(t−1), this fifth equation in one example is h(t)=h(t−1)*f(SF$_5$), where SF$_5$ is a scaling factor defined for scaling the health metric 32 when the governing SLA is violated, and where SF$_5$<1. In general, though, the service desk management server 26 in some embodiments calculates the health metric 32 based on whether, or an extent to which, a SLA governing the customer-facing IT service is violated due to delay in closing the incident.

Although the above embodiments were illustrated in the context of an incident, the embodiments are equally applicable to a change order associated with a customer-facing IT service. For example, the health metric 32 in some embodiments is calculated based on an urgency of the change order, an impact of the change order (or its associated incident), a priority of the change order, an escalation status of the change order, a closure status of the change order, or any combination thereof. And the service desk management server 26 in some embodiments calculates the health metric 32 based on whether, or an extent to which, a SLA governing the customer-facing IT service is violated due to delay in closing the change order.

Figure 5A:
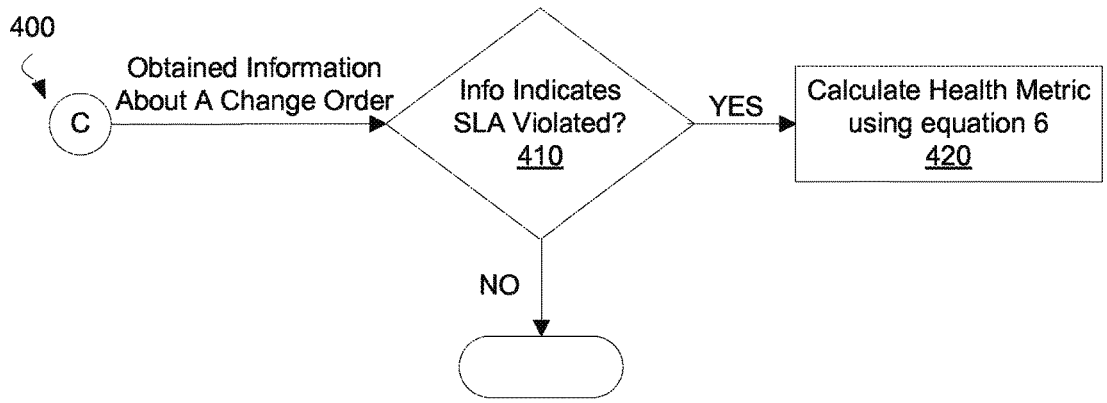
FIGS. 5A-5C are logic flow diagrams of methods for calculating a health metric based on information about a change order associated with a service, according to one or more embodiments.
Figure 5B:
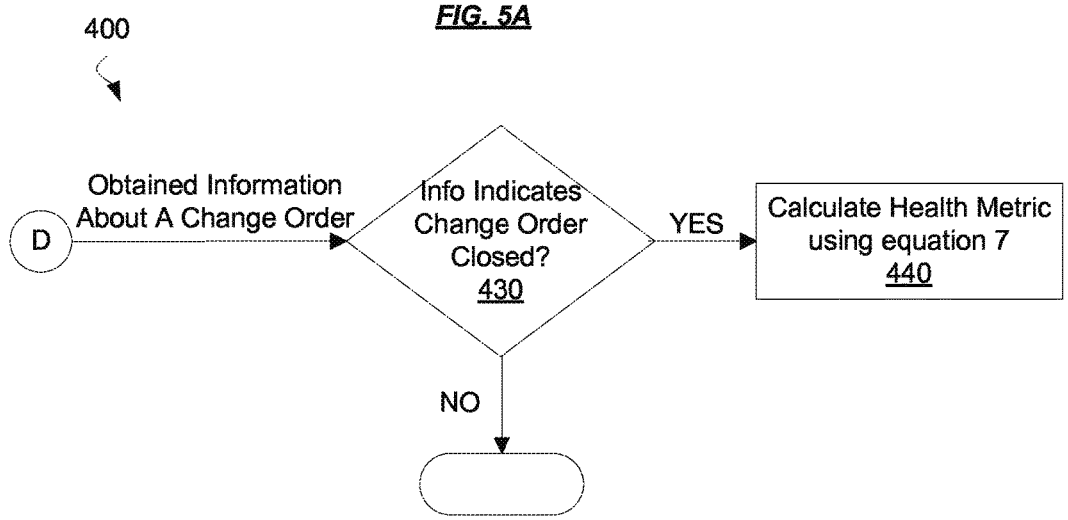

FIGS. 5A-5B in this regard illustrate exemplary embodiments where the service desk management server 26 calculates the health metric 32 using different equations for different types of information obtained about a change order associated with the service. As shown in FIG. 5A, the service desk management server 26 determines whether the information indicates that the governing SLA is violated (Block 410). If so (YES at Block 410), the service desk management server 26 calculates the health metric 32 using a sixth equation (i.e., equation 6) (Block 420). In embodiments where the service desk management server 26 calculates the health metric h(t) recursively using a previously calculated metric h(t−1), this sixth equation in one example is h(t)=h(t−1)*f(SF$_6$), where SF$_6$ is a scaling factor defined for scaling the health metric 32 when the SLA governing a change order is violated, and where SF$_6$<1.

Similarly, as shown in FIG. 5B, the service desk management server 26 determines whether the information indicates that the change order has been closed (Block 430). If so (YES at Block 430), the service desk management server 26 calculates the health metric 32 using an seventh equation (i.e., equation 7) (Block 440).

This eighth equation in some embodiments calculates the health metric 32 based simply on whether the change order has been closed. In other embodiments, though, the seventh equation calculates the health metric 32 based on the actual time at which the change order was closed. For example, in embodiments where the service desk management server 26 calculates the health metric h(t) recursively using a previously calculated metric h(t−1), this seventh equation may be h(t)=h(t−1)*f(ct)*f(SF$_7$), where SF$_7$ is a scaling factor defined for scaling the health metric 32 when a change order associated with a service has been closed, where SF$_7$<1 and where ct is the change order's closure time.

The eighth equation in still other embodiments calculates the health metric 32 based not only on the actual time at which the change order was closed, but also based on the time at which the change order was supposed to have been closed according to the applicable SLA, e.g., based on the extent to which the SLA governing the service is violated due to delay in closing the change order. In one embodiment, for example, the service desk management server 26 computes f(ct) above based on the change order's closure time and the time at which the change order should have been closed according to the applicable SLA, e.g., f(ct)=ct/vt or f(ct)=ct−vt, where vt is the time the change order should have been closed (else a violation of the SLA occurs) and vt<ct (i.e., an SLA violation occurred).

Figure 5C:
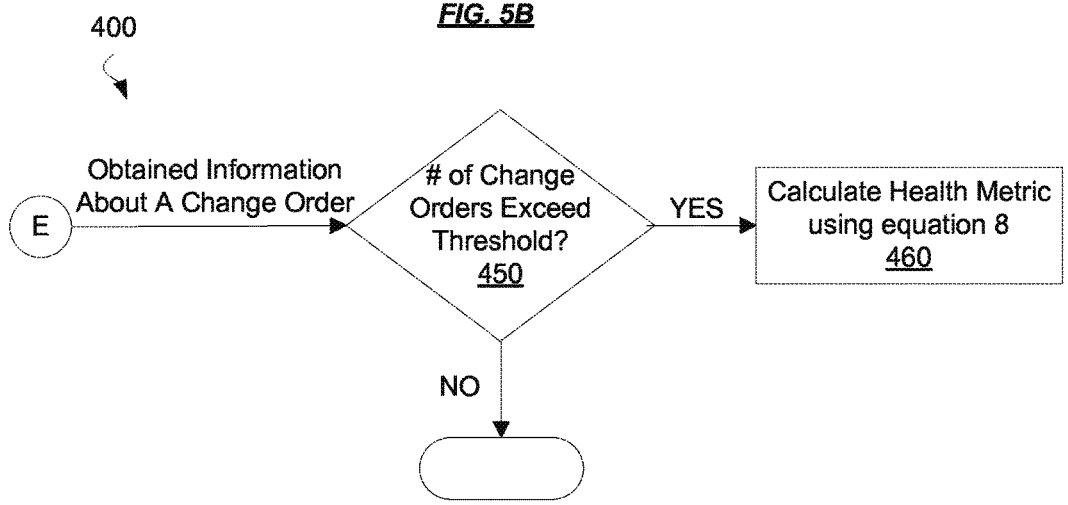

In still other embodiments, the service desk management server 26 calculates the health metric 32 as a function of how many unclosed change orders are pending that affect the customer-facing IT service. As shown in FIG. 5C, for example, the service desk management server 26 determines whether the information indicates that the number of change orders associated with the service exceeds a defined threshold (Block 450). If so (YES at Block 450), the service desk management server 26 calculates the health metric 32 using an eighth equation (i.e., equation 8) (Block 460). For example, in embodiments where the service desk management server 26 calculates the health metric h(t) recursively using a previously calculated metric h(t−1), this eighth equation may be h(t)=h(t−1)*f(c−th)*f($SF_8$), where $SF_8$ is a scaling factor defined for scaling the health metric 32 when the number of unclosed change orders c exceeds a threshold th, and where $SF_8$<1. In one embodiment, for example, the service desk management server 26 computes f(c−th) above as $$f(c - th) = \frac{1}{c - th}.$$

As one concrete example, consider an email service that has 3 major incidents reported against it by customers 12, and a major change planned soon for the service. In this example, the 3 major incidents may reduce the email service's health metric by 3*$SF_2$, and the major change may reduce the email service's health metric by $SF_8$ if the major change is the only unclosed change order and the threshold th=0. In at least some embodiments, $SF_8$<$SF_2$ so that a change order reduces a service's health metric by a lesser extent than a major incident.

In some embodiments, an incident or change order is associated with a customer-facing IT service in the sense that the incident or change order directly concerns that service. For example, when a customer 12 reports that an incident has occurred specifically with the service itself, that incident directly concerns the service. Or, when a change order specifically orders a change to the service itself, the change order directly concerns that service.

In other embodiments, an incident or change order is associated with a customer-facing IT service under certain conditions, even if the incident or change order does not directly concern that service. In this regard, a customer-facing IT service may depend on and/or be related to one or more so-called service assets. A service asset is any resource or capability of the IT service provider, including for instance infrastructure, processes, applications, etc. An incident or change order is associated with a customer-facing IT service, even if the incident or change order does not directly concern that service, if the incident or change order directly concerns a service asset that the service depends on or relates to.

Figure 6A:
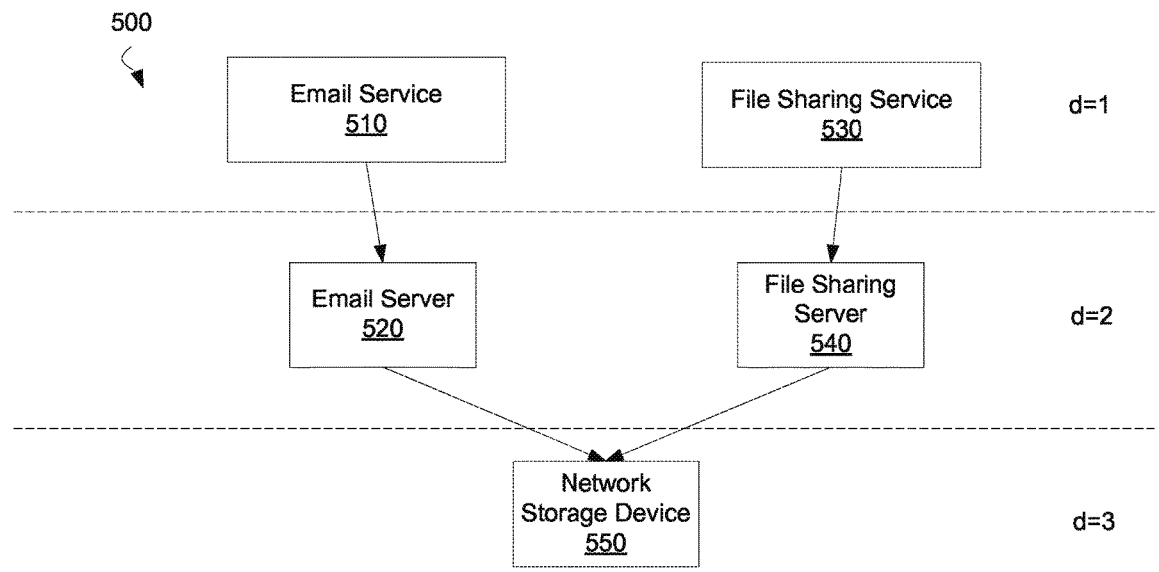
FIG. 6A is a block diagram of a dependency graph according to one or more embodiments.

A customer-facing IT service depends on a service asset when that service asset supports the delivery of the customer-facing IT service. The service may depend on different service assets to different degrees, at least in the sense of how directly the asset supports the service. Such dependency may be represented for instance by a dependency graph, which is a directed graph that represents dependencies of different objects towards each other. For example, as shown by the dependency graph 500 in FIG. 6A, an email service 510 depends on an email server 520 for the delivery of that service 510, a file sharing service 530 depends on a file sharing server 540, and both the email server 530 and the file sharing server 540 in turn depend on a network storage device 550 for storage of email and files. The depth d in FIG. 6A reflects the depth of a path in the graph 500 from a service 510, 530 to a particular asset. This depth in some sense describes the degree to which a service depends on an asset.

Figure 6B:
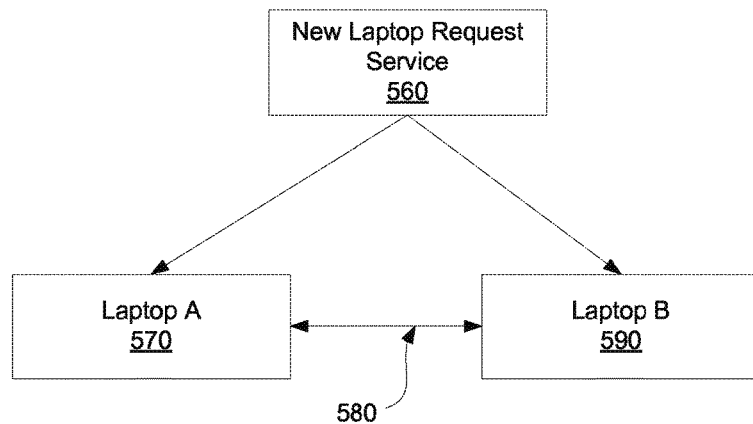
FIG. 6B is a block diagram of a relation between different service assets according to one or more embodiments.

By contrast, a customer-facing IT service relates to a service asset when the service desk management server's database 24 defines a relation between the asset and the service, or a relation between the asset and an asset on which the service depends. Consider for instance the example shown in FIG. 6B for a customer-facing IT service that comprises requesting a new laptop 560. In this case, the new laptop request service 560 depends on a particular laptop A 570 as a service asset. The database 24 in this example defines a relation 580 between this laptop 570 and a different laptop B 590 because those laptops are made by the same manufacturer.

Figure 7:
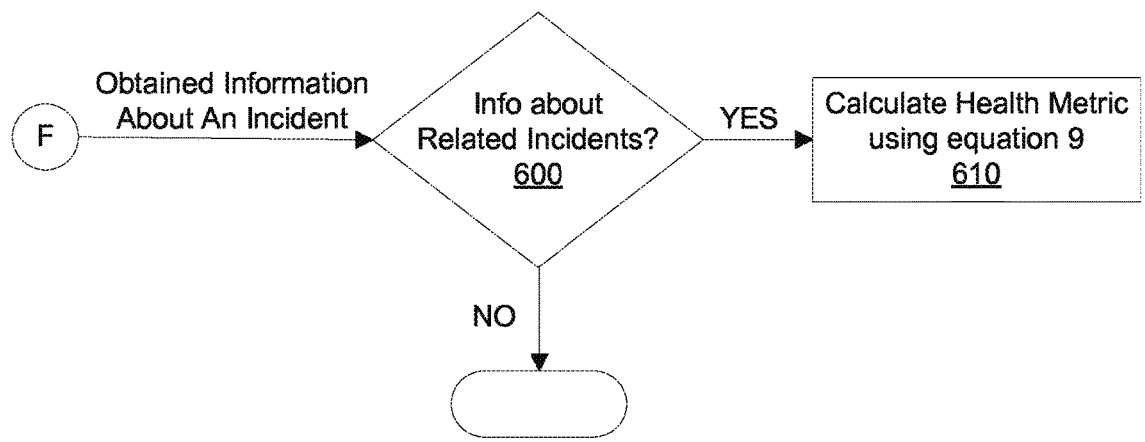
FIG. 7 is a logic flow diagram of a method for calculating a health metric based on information about an incident that directly concerns a service asset related to a service, according to one or more embodiments.

With this in mind, the service desk management server 26 in some embodiments calculates the health metric 32 for a customer-facing IT service based on information about an incident, change order, or both that directly concerns a service asset that the service depends on or relates to. FIG. 7 illustrates one example where the service desk management server 26 calculates the health metric 32 for a service based on information about an incident that directly concerns a service asset related to the service.

As shown in FIG. 7, the service desk management server 26 determines whether the information is about an incident that directly concerns a service asset related to the service. for which the server 26 is calculating the health metric 32 (Block 600). If so (YES at Block 600), the service desk management server 26 calculates the health metric 32 using a ninth equation (i.e., equation 9) (Block 610). For example, in embodiments where the service desk management server 26 calculates the health metric h(t) recursively using a previously calculated metric h(t−1), this ninth equation may be h(t)=h(t−1)*f(r−t)*f($SF_9$), where $SF_9$ is a scaling factor defined for scaling the health metric 32 based on incidents concerning related service assets, where r is the number of incidents concerning related service assets, t is a threshold, and where $SF_9$<1. In one embodiment, for example, the service desk management server 26 simply computes f(r−t) above as f(r−t)=r−t.

In general, therefore, the service desk management server 26 in at least some embodiments determines that an incident directly concerns a service asset on which the customer-facing IT service does not depend, but that the service asset is related to the customer-facing IT service, or to a service asset on which the customer-facing IT service does depend, as defined in a database 24 accessed by the service desk management server 26. In this case, the service desk management server 26 in some embodiments, based on that determination, increments a count of a number of incidents concerning related service assets, and calculates the health metric 32 as a function of that count.

As a practical example of this, consider a scenario where a customer-facing IT service involves a customer requesting a Dell Laptop E6430. In this case, the service desk management server 26 obtains information about incidents directly concerning other Dell laptops (as related service assets), not just the requested model, and calculates the health metric 32 based on that information. If there are a number of incidents pending against other Dell laptops (as related service assets), the health metric 32 may reflect poor customer-perceived health for that service, even if there are not any pending incidents reported against that specific model laptop. In this case, the health metric 32 deters the customer from selecting the potentially problematic Dell laptop and steers the customer towards selecting a laptop from a different manufacturer available in the catalog 18 (e.g., HP).

In other embodiments, the service desk management server 26 calculates the health metric 32 for a customer-facing IT service based on information about an incident, change order, or both that directly concerns a service asset on which the service depends. In one embodiment, for example, the server 26 calculates the health metric 32 as a function of a depth d of path in a dependency graph from the customer-facing IT service to the service asset. When the incident or change order directly concerns the customer-facing IT service itself, d is unity. When the incident or change order directly concerns a service asset on which the customer-facing IT service depends, d is a number greater than unity reflecting a depth of a path in a dependency graph from the customer-facing IT service to the service asset.

For example, in some embodiments, the service desk management server 26 calculates f(SF) described above as $$f(SF) = \frac{SF}{d},$$

where SF is again a scaling factor that depends on the obtained information. So, in embodiments where the service desk management server 26 calculates the health metric h(t) recursively using a previously calculated metric h(t−1), the health metric 32 for some types of obtained information may be $$h(t) = h(t-1) * \frac{SF}{d}.$$

Regardless, factoring in such dependency permits the service desk manager server 26 to reduce a service's health metric to a lesser degree when an incident or change order does not directly concern that service.

Figure 8:
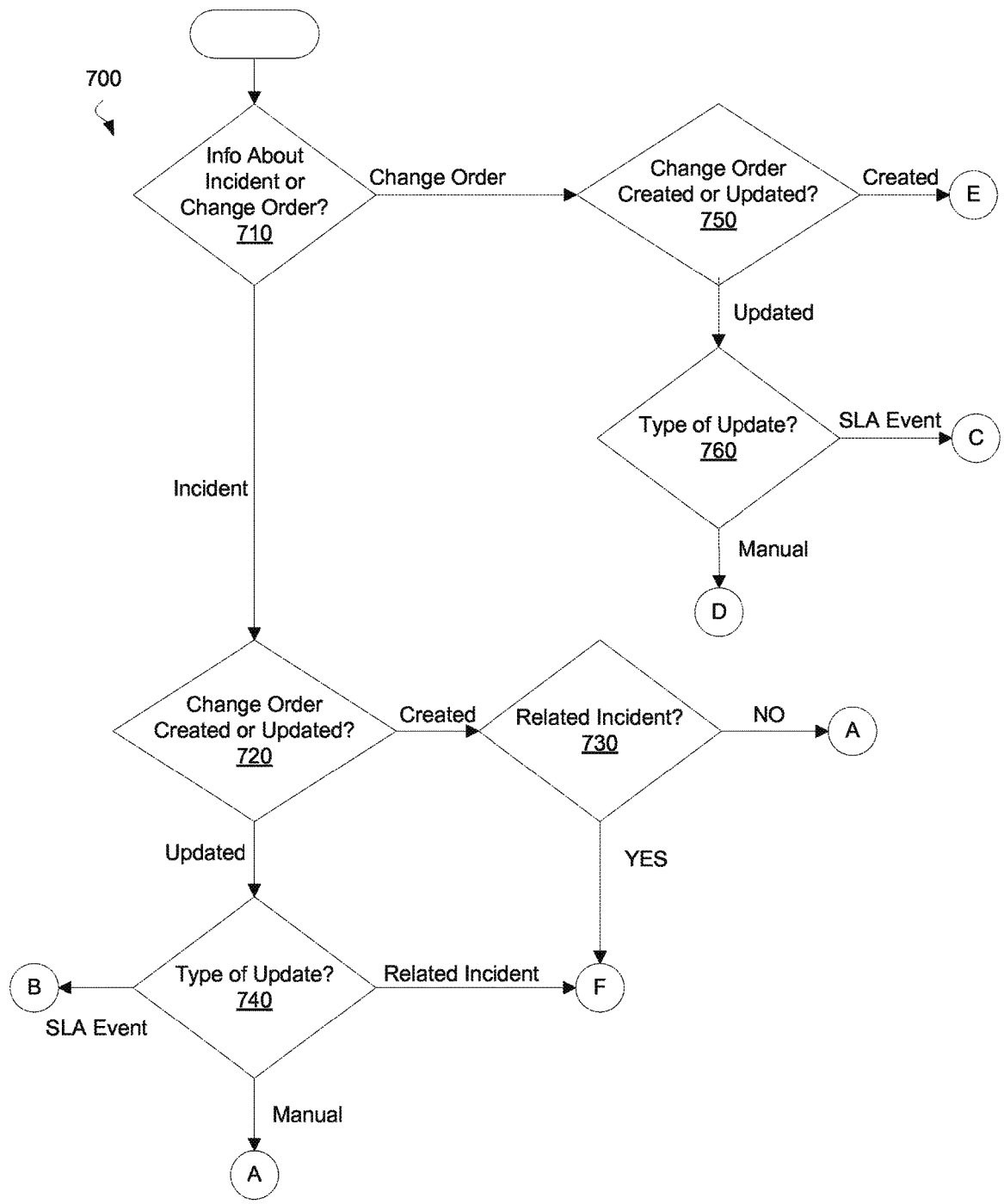
FIG. 8 is a logic flow diagram of a method for substantially real-time calculation of a health metric, according to one or more embodiments.

In at least some embodiments, the service desk management server 26 updates the health metric 32 in substantially real-time, as incidents or change orders occur or change in status. The service desk management server 26 in one embodiment, for example, monitors for the occurrence of or status changes to incidents or change orders associated with one or more customer-facing IT services, such as by subscribing to notifications regarding such incidents or change orders. FIG. 8 illustrates one example of processing 700 performed by the service desk management server 26 upon obtaining incident or change order information associated with a customer-facing IT service in substantially real-time.

As shown in FIG. 8, the service desk management server 26 determines whether the information is about an incident or change order (Block 710). If the information is about an incident, the server 26 determines whether the information indicates the creation of a new incident or an update to an existing incident (Block 720). If the information indicates the creation of a new incident, processing 700 proceeds to Block 730, where the server 26 determines whether the newly created incident concerns a service asset that is related to the service but that the service does not depend on (Block 730). If so, processing 700 proceeds to that shown in FIG. 7. If not, processing 700 proceeds to that shown in FIG. 4A, except that processing may not include Blocks 350 and 370 since those only concern updates to an incident.

On the other hand, if the information indicates an update to an existing incident, the server 26 determines what type of update the information indicates (Block 740). If the information indicates a manual update about an incident that concerns the service itself, or a service asset on which the service depends, processing 700 proceeds to that shown in FIG. 4A. An update is manual in this sense if the update was entered into the system 10 manually by service desk personnel or customers 12. If the information indicates an SLA event automatically detected for an incident that concerns the service itself, or a service asset on which the service depends, processing 700 proceeds to that shown in FIG. 4B. And if the information indicates an incident concerning a service asset that is related to the service, but that the service does not depend on, processing 700 proceeds to that shown in FIG. 7.

If instead the information is about a change order, processing 700 proceeds to Block 750, whereupon the server 26 determines whether the information indicates the creation of a new change order or an update to an existing change order. If the information indicates the creation of a new change order, processing 700 proceeds to that shown in FIG. 5C. If the information instead indicates an update to an existing change order, processing 700 proceeds to Block 760, whereupon the server 26 determines what type of update the information indicates about the change order. If the update is an SLA event automatically detected for a change order that concerns the service itself, or a service asset on which the service depends, processing 700 proceeds to that shown in FIG. 5A. But if the information indicates a manual update about a change order that concerns the service itself, or a service asset on which the service depends, processing 700 proceeds to that shown in FIG. 5B.

The calculation of the health metric 32 in this way is in some embodiments part of a larger process for realizing service asset and configuration management (SACM). Service asset and configuration management is a process for ensuring that assets required to deliver services are properly controlled, and that accurate and reliable information about those assets is available when and where it is needed. This information includes details of how the assets have been configured and the relationships between assets. The system 10 in these embodiments implements the database 24 as a configuration management database (CMDB) for storing configuration items (CIs) which represent the different assets within the system 10. A configuration item (CI) is any component or other service asset that needs to be managed in order to deliver an IT service. The system 10 maintains these CIs throughout their lifecycle.

Figure 9:
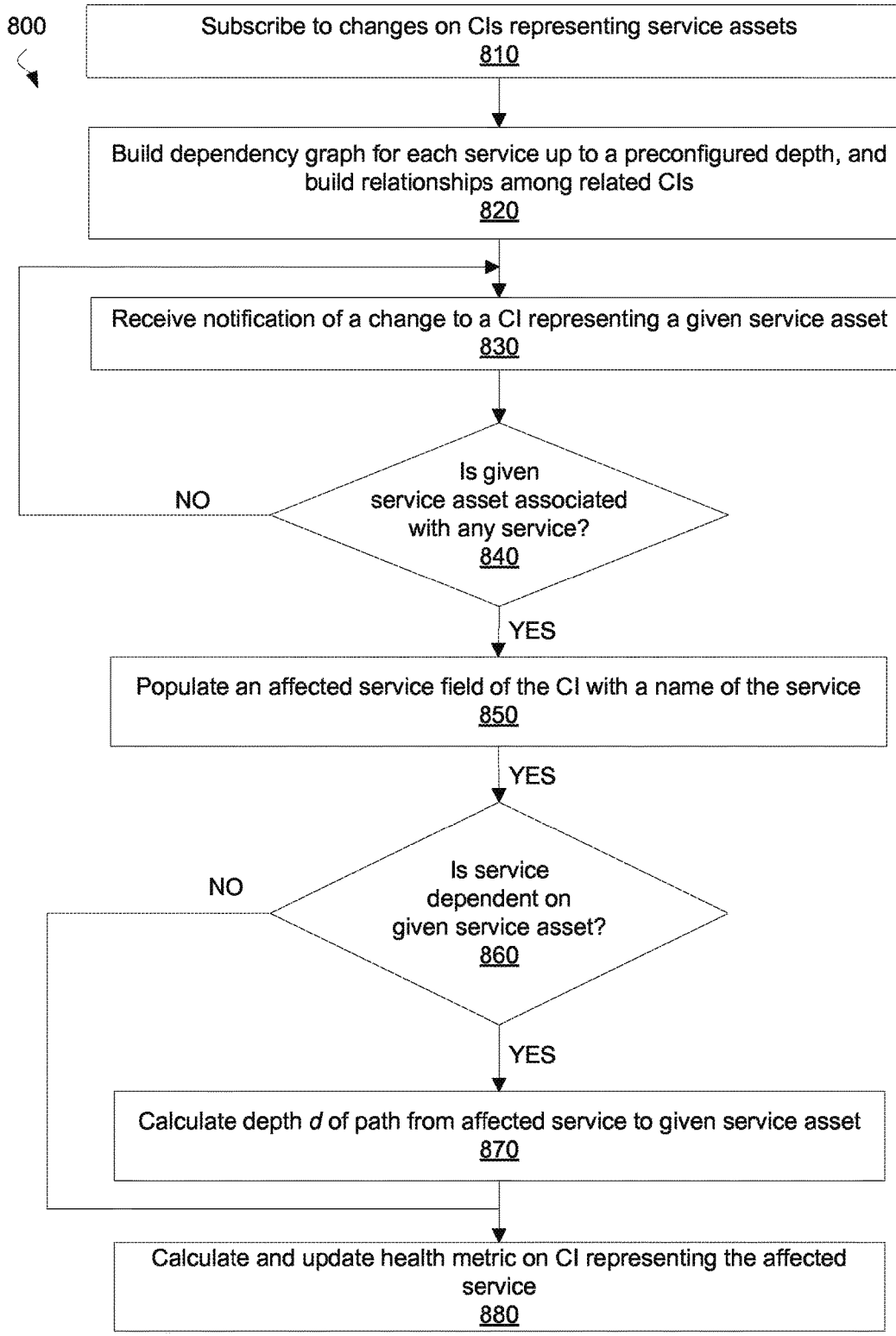
FIG. 9 is a logic flow diagram of a method for calculating a health metric as a part of service asset and configuration management, according to one or more embodiments.

FIG. 9 shows processing 800 by the service desk management server 26 for leveraging the CIs in the CMDB 24 to realize substantially real-time health metric updates. As shown, the server 26 subscribes to changes on CIs representing service assets in the system 10 (Block 810). In some embodiments, for example, the server 26 loads all available CIs and subscribes for changes on them. The server 26 then builds a dependency graph for each service up to a preconfigured depth, and builds relationships among related CIs (Block 820). The server 26 next monitors for changes to the CIs. Upon receiving a substantially real-time notification of a change to a CI representing a given service asset (Block 830), the server 26 determines whether the given service asset is associated with any service (Block 840). That is, the server 26 determines whether the service depends on or is related to the given service asset. If not (NO at block 840), the server 26 resumes monitoring for CI changes. If so (YES at block 840), the server 26 populates an affected service field of the changed CI with a name of the service with which the given service asset is associated (Block 850). If that service is dependent on the given service asset (YES at Block 860), the server 26 also calculates the depth d of a path from the affected service to the given service asset (Block 870). The server 26 then calculates the health metric for the affected service according to any of the embodiments herein (e.g., recursively based on a previously calculated health metric for that service), and updates the CI representing the service with the calculated health metric (Block 880).

Figure 10:
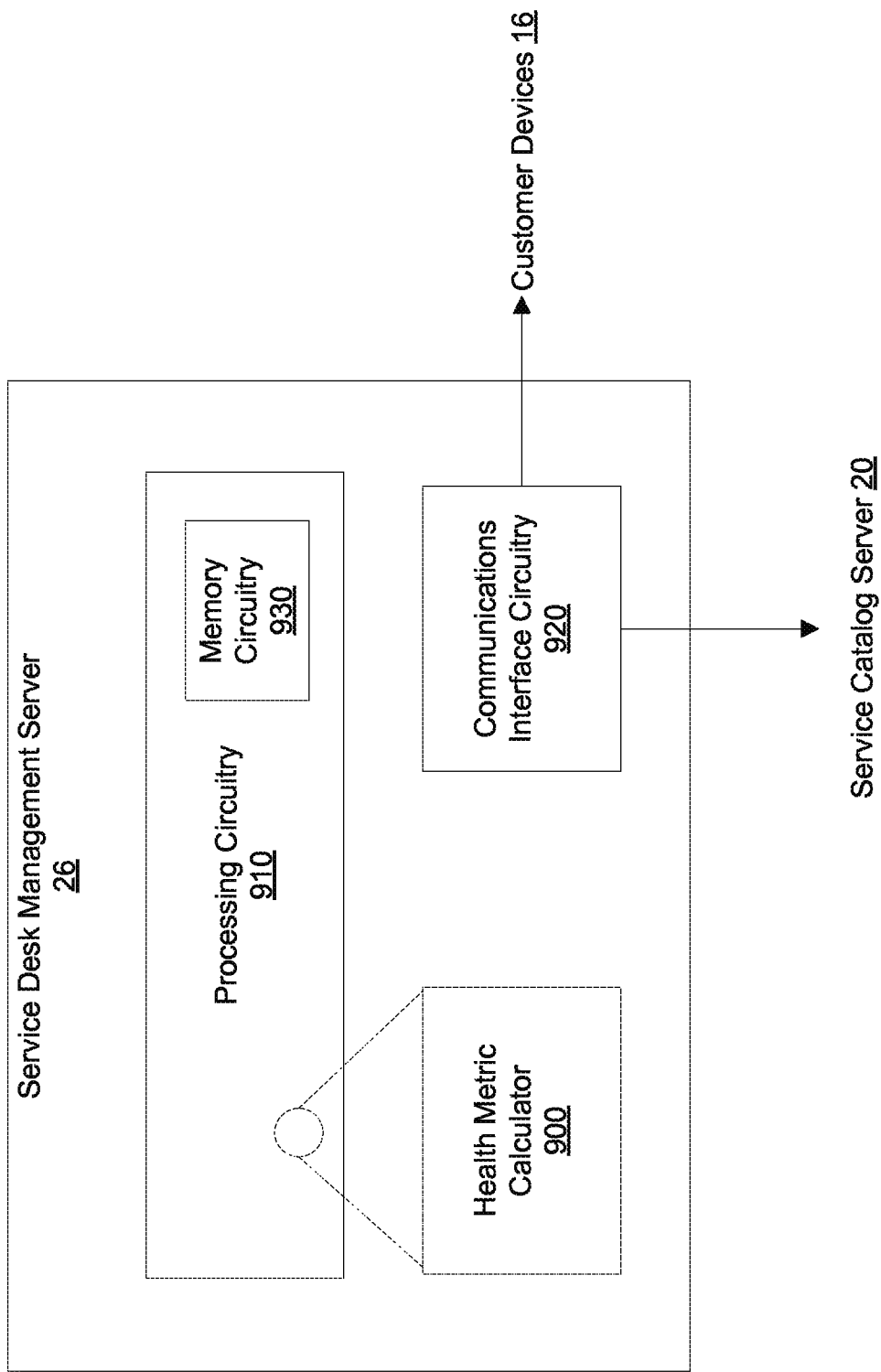
FIG. 10 is a block diagram of a service desk management server according to one or more embodiments.

With the above modifications and variations in mind, the service desk management server 26 is configured via any functional means or units to implement any of the processing described above, e.g., as shown in FIG. 2A. In at least some embodiments, for example, the server 26 comprises circuitry configured to implement a health metric calculator and any other functional means or units for realizing the above processing. FIG. 10 illustrates the server 26 in one or more of these embodiments.

As shown in FIG. 10, the service desk management server 26 comprises processing circuitry 910 and communications interface circuitry 920. Processing circuitry 910 may be configured to implement a health metric calculator 900 for calculating a health metric as described herein. Processing circuitry 910 in this regard may comprise circuits dedicated to performing certain functional processing and/or one or more microprocessors in conjunction with memory 930. In embodiments that employ memory 930, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described Processing circuitry 910 may be implemented by circuitry comprising one or more microprocessors, hardware, firmware, or a combination thereof. In this regard, processing circuitry 910 may be configured to implement instructions that are stored in associated memory 930 and that comprise the logic and instructions needed to perform processing described herein.

The communication interface circuitry 920 includes various components (not shown) for sending and/or receiving information between the server 26 and customer devices 16, and for sending and/or receiving information between the server 26 and service catalog server 20. More particularly, the interface circuitry 920 includes a transmitter that is configured to use known signal processing techniques, typically according to one or more standards, and is configured to condition a signal for transmission. Similarly, the interface circuitry 920 includes a receiver that is configured to convert signals received into digital samples for processing by the processing circuitry 910.

Figure 11:
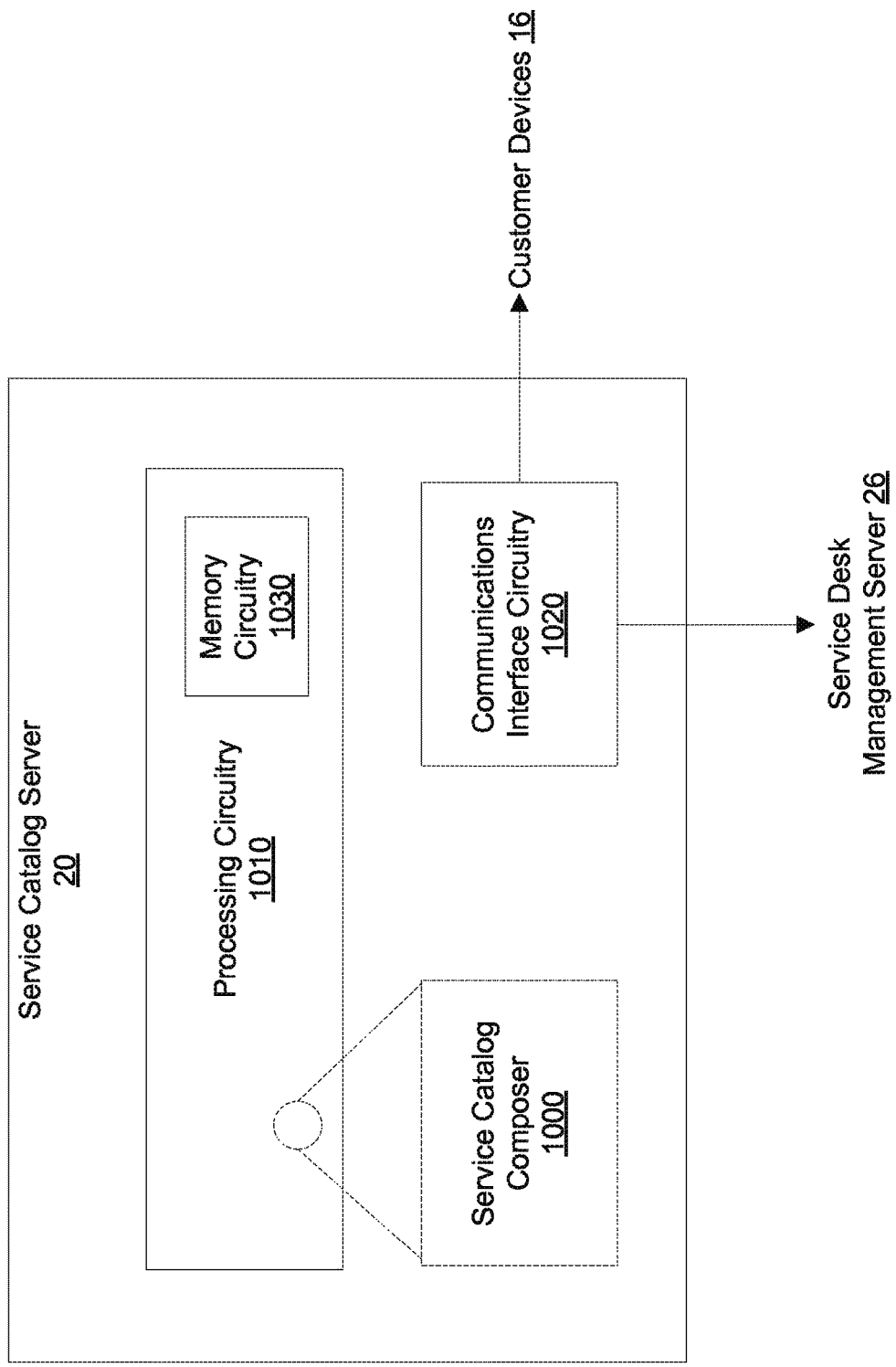
FIG. 11 is a block diagram of a service catalog server according to one or more embodiments.

Also with the above modifications and variations in mind, the service catalog server 20 is configured via any functional means or units to implement any of the processing described above, e.g., as shown in FIG. 2B. In at least some embodiments, for example, the server 20 comprises circuitry configured to implement a service catalog composer and any other functional means or units for realizing the above processing. FIG. 11 illustrates the server 20 in one or more of these embodiments.

As shown in FIG. 11, the service catalog server 26 comprises processing circuitry 1010 and communications interface circuitry 1020. Processing circuitry 1010 may be configured to implement a service catalog composer 1000 for composing a service catalog 18 as described herein. Processing circuitry 1010 in this regard may comprise circuits dedicated to performing certain functional processing and/or one or more microprocessors in conjunction with memory 1030. In embodiments that employ memory 1030, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described Processing circuitry 1010 may be implemented by circuitry comprising one or more microprocessors, hardware, firmware, or a combination thereof. In this regard, processing circuitry 1010 may be configured to implement instructions that are stored in associated memory 1030 and that comprise the logic and instructions needed to perform processing described herein.

The communication interface circuitry 1020 includes various components (not shown) for sending and/or receiving information between the server 20 and customer devices 16, and for sending and/or receiving information between the server 20 and service desk management server 26. More particularly, the interface circuitry 1020 includes a transmitter that is configured to use known signal processing techniques, typically according to one or more standards, and is configured to condition a signal for transmission. Similarly, the interface circuitry 1020 includes a receiver that is configured to convert signals received into digital samples for processing by the processing circuitry 1010.

Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
obtaining, by a service desk management server, information about an incident associated with a customer-facing information technology (IT) service, a change order associated with the customer-facing IT service, or both;
calculating, by the service desk management server and as a function of the obtained information, a health metric that quantitatively indicates a customer-perceived health of the customer-facing IT service, wherein said calculating comprises recursively calculating the health metric h(t) as $$h(t) = h(t-1) \cdot \frac{SF}{d},$$

wherein SF is a scaling factor that depends on the obtained information, and wherein, when the incident or change order directly concerns the customer-facing IT service itself, d is unity and, when the incident or change order directly concerns a service asset on which the customer-facing IT service depends, d is a number greater than unity reflecting a depth of a path in a dependency graph from the customer-facing IT service to the service asset; and
assisting a service catalog server to compose a service catalog to indicate the health metric for the customer-facing IT service to prospective customers of that service, wherein said assisting comprises sending the health metric from the service desk management server to the service catalog server.

2. The method of claim 1, wherein calculating the health metric comprises recursively calculating the health metric also as a function of a previously calculated health metric for the customer-facing IT service.

3. The method of claim 2, wherein recursively calculating the health metric comprises determining a scaling factor based on the obtained information and scaling the previously calculating health metric by a function of the scaling factor.

4. The method of claim 1, wherein the obtained information is about an incident associated with the customer-facing IT service, and wherein calculating the health metric comprises calculating the health metric based on an urgency of the incident, an impact of the incident, a priority of the incident, whether the incident is defined as a major incident, an escalation status of the incident, a closure status of the incident, or any combination thereof described by the obtained information.

5. The method of claim 1, wherein calculating the health metric comprises calculating the health metric based on whether, or an extent to which, a service level agreement governing the customer-facing IT service is violated due to delay in closing the incident, delay in closing the change order, or both.

6. The method of claim 1, wherein calculating the health metric comprises calculating the health metric as a function of how many unclosed change orders are pending that affect the customer-facing IT service.

7. The method of claim 1, further comprising determining, by the service desk management server, that the incident directly concerns a service asset on which the customer-facing IT service does not depend, but that the service asset is related to the customer-facing IT service, or to a service asset on which the customer-facing IT service does depend, as defined in a database accessed by the service desk management server, and based on said determining incrementing a count of a number of incidents concerning related service assets, and wherein calculating the health metric comprises calculating the health metric as a function of said count.

8. The method of claim 1, wherein the incident or change order directly concerns a service asset on which the customer-facing IT service depends, and wherein calculating the health metric comprises calculating the health metric as a function of a depth of a path in a dependency graph from the customer-facing IT service to the service asset.

9. The method of claim 1, further comprising, by the service catalog server, receiving the health metric from the service desk management server and composing the service catalog to indicate the health metric for the customer-facing IT service to prospective customers of that service.

10. A service desk management server, comprising:
a communications interface to a service catalog server; and
processing circuitry configured to:
obtain information about an incident associated with a customer-facing IT service, a change order associated with the customer-facing IT service, or both;
calculate, as a function of the obtained information, a health metric that quantitatively indicates a customer-perceived health of the customer-facing IT service, wherein to calculate the health metric, the processing circuitry is configured to recursively calculate the health metric h as $$h = h \cdot \frac{f}{d},$$

wherein f depends on the obtained information, and wherein, when the incident or change order directly concerns the customer-facing IT service itself, d is unity and, when the incident or change order directly concerns a service asset on which the customer-facing IT service depends, d is a number greater than unity reflecting a depth of a path in a dependency graph from the customer-facing IT service to the service asset; and
assist the service catalog server to compose a service catalog to indicate the health metric for the customer-facing IT service to prospective customers of that service, by sending the health metric from the service desk management server to the service catalog server via the communications interface.

11. The service desk management server of claim 10, wherein the processing circuitry is configured to recursively calculate the health metric also as a function of a previously calculated health metric for the customer-facing IT service.

12. The service desk management server of claim 11, wherein the processing circuitry is configured to recursively calculate the health metric by determining a scaling factor based on the obtained information and scaling the previously calculating health metric by a function of the scaling factor.

13. The service desk management server of claim 10, wherein the obtained information is about an incident associated with the customer-facing IT service, and wherein the processing circuitry is configured to calculate the health metric based on an urgency of the incident, an impact of the incident, a priority of the incident, whether the incident is defined as a major incident, an escalation status of the incident, a closure status of the incident, or any combination thereof described by the obtained information.

14. The service desk management server of claim 10, wherein the processing circuitry is configured to calculate the health metric based on whether, or an extent to which, a service level agreement governing the customer-facing IT service is violated due to delay in closing the incident, delay in closing the change order, or both.

15. The service desk management server of claim 10, wherein the processing circuitry is configured to calculate the health metric as a function of how many unclosed change orders are pending that affect the customer-facing IT service.

16. The service desk management server of claim 10, wherein the processing circuitry is configured to:
determine that the incident or change order directly concerns a service asset on which the customer-facing IT service does not depend, but that the service asset is related to the customer-facing IT service, or to a service asset on which the customer-facing IT service does depend, as defined in a database accessed by the service desk management server;
based on said determination, increment a count of a number of incidents or change orders concerning related service assets; and
calculate the health metric as a function of said count.

17. The service desk management server of claim 10, wherein the incident or change order directly concerns a service asset on which the customer-facing IT service depends, and wherein the processing circuitry is configured to calculate the health metric as a function of a depth of a path in a dependency graph from the customer-facing IT service to the service asset.

18. A computer program product stored on a non-transitory computer-readable storage medium and comprising computer program code that, when executed by a processing circuit of a service desk management server, configures the service desk management server to:
  obtain information describing an incident associated with a customer-facing information technology (IT) service, a change order associated with the customer-facing IT service, or both;
  calculate, as a function of the obtained information, a health metric that quantitatively indicates a customer-perceived health of the customer-facing IT service, wherein when executed by the processing circuitry, the computer program code configures the service desk management server to recursively calculate the health metric h as $$h = h \cdot \frac{f}{d},$$

wherein f depends on the obtained information, and wherein, when the incident or change order directly concerns the customer-facing IT service itself, d is unity and, when the incident or change order directly concerns a service asset on which the customer-facing IT service depends, d is a number greater than unity reflecting a depth of a path in a dependency graph from the customer-facing IT service to the service asset; and
  assist a service catalog server to compose a service catalog to indicate the health metric for the customer-facing IT service to prospective customers of that service, by sending the health metric from the service desk management server to the service catalog server.

* * * * *